United States Patent
Gheorghiu et al.

(10) Patent No.: US 10,972,920 B2
(45) Date of Patent: Apr. 6, 2021

(54) FLEXIBLE RADIO RESOURCE MANAGEMENT (RRM) MEASUREMENTS FOR WIRELESS NETWORKS

(71) Applicant: QUALCOMM Incorporated, San Diego, CA (US)

(72) Inventors: Valentin Alexandru Gheorghiu, Tokyo (JP); Masato Kitazoe, Tokyo (JP); Brian Clarke Banister, San Diego, CA (US); Alexei Yurievitch Gorokhov, San Diego, CA (US); Tingfang Ji, San Diego, CA (US); Shivratna Giri Srinivasan, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 13/753,213

(22) Filed: Jan. 29, 2013

(65) Prior Publication Data
US 2013/0196603 A1     Aug. 1, 2013

Related U.S. Application Data

(60) Provisional application No. 61/680,177, filed on Aug. 6, 2012, provisional application No. 61/592,441, filed on Jan. 30, 2012.

(51) Int. Cl.
*H04W 24/00* (2009.01)
*H04L 5/00* (2006.01)
(Continued)

(52) U.S. Cl.
CPC ........... *H04W 24/00* (2013.01); *H04L 5/0048* (2013.01); *H04L 5/0092* (2013.01); *H04W 24/10* (2013.01);
(Continued)

(58) Field of Classification Search
USPC ....................................................... 455/67.11
See application file for complete search history.

(56) References Cited

U.S. PATENT DOCUMENTS

8,014,311 B2   9/2011 Lindoff et al.
2005/0078707 A1*  4/2005 Maltsev et al. ............... 370/471
(Continued)

FOREIGN PATENT DOCUMENTS

CN       101370227 A       2/2009
WO    WO-2010032675 A1    3/2010
(Continued)

OTHER PUBLICATIONS

International Search Report and Written Opinion—PCT/US2013/023749—ISA/EPO—dated Mar. 25, 2013.
(Continued)

*Primary Examiner* — Yuwen Pan
*Assistant Examiner* — Fatuma G Sherif
(74) *Attorney, Agent, or Firm* — Patterson+ Sheridan, L.L.P.

(57) ABSTRACT

Methods and apparatus for performing reference signal (RS) metric measurements in different parts of a channel bandwidth are described. One example method generally includes receiving signaling indicating one or more frequency bands within an operating frequency band of a current serving cell for performing reference signal (RS) metric measurements, performing the measurements on the one or more frequency bands, and reporting the measurements.

17 Claims, 9 Drawing Sheets

(51) Int. Cl.
*H04W 24/10* (2009.01)
*H04L 1/00* (2006.01)

(52) U.S. Cl.
CPC .......... *H04L 1/0026* (2013.01); *H04L 5/0023* (2013.01); *H04L 5/0064* (2013.01); *H04L 5/0085* (2013.01)

(56) References Cited

U.S. PATENT DOCUMENTS

| | | | |
|---|---|---|---|
| 2009/0028112 A1* | 1/2009 | Attar | H04W 36/245 370/332 |
| 2009/0042532 A1* | 2/2009 | Bienas | H04W 24/00 455/403 |
| 2010/0208603 A1* | 8/2010 | Ishii | 370/252 |
| 2010/0278132 A1 | 11/2010 | Palanki et al. | |
| 2010/0279707 A1* | 11/2010 | Fischer et al. | 455/456.1 |
| 2011/0110254 A1* | 5/2011 | Ji | H04W 36/0066 370/252 |
| 2011/0243005 A1 | 10/2011 | Sun | |
| 2011/0249643 A1 | 10/2011 | Barbieri et al. | |
| 2011/0280223 A1 | 11/2011 | Maeda et al. | |
| 2012/0009941 A1* | 1/2012 | Zhou et al. | 455/456.1 |
| 2012/0088516 A1 | 4/2012 | Ji et al. | |
| 2012/0115463 A1 | 5/2012 | Weng et al. | |
| 2012/0307922 A1* | 12/2012 | Simonsson | H04W 24/10 375/260 |

FOREIGN PATENT DOCUMENTS

WO       2011130452       10/2011
WO       WO-2011130393 A1  10/2011

OTHER PUBLICATIONS

Kazmi, et al., "Evaluation of inter-frequency quality handover criteria in E-UTRAN", IEEE 69th Vehicular Technology Conference, 2009, pp. 1-5.

Ericsson et al., "Analysis of Wider Measurement BW for RSRQ," 3GPP Draft; R4-115700 RSRQ Wide Bw, 3rd Generation Partnership Project (3GPP), Mobile Competence Centre ; 650, Route Des Lucioles ; F-06921 Sophia-Antipolis Cedex ; France, vol. TSG RAN, No. San Francisco, US; Nov. 14, 2011-Nov. 18, 2011, Nov. 7, 2011 (Nov. 7, 2011), XP050567133, [retrieved on Nov. 7, 2011], 3 pages.

NTT DOCOMO : "Issues on Narrow Measurement Bandwidth," 3GPP Draft; R4-114243, 3rd Generation Partnership Project (3GPP), Mobile Competence Centre ; 650, Route Des Lucioles ; F-06921 Sophia-Antipolis Cedex ; France, vol. RAN Wg4, No. Athens, Greece; Aug. 22, 2011, Aug. 19, 2011 (Aug. 19, 2011), XP050543671, [retrieved on Aug. 19, 2011], 5 pages.

* cited by examiner

FLEXIBLE RADIO RESOURCE MANAGEMENT (RRM) MEASUREMENTS FOR WIRELESS NETWORKS

CLAIM OF PRIORITY UNDER 35 U.S.C. § 119

This application claims benefit of U.S. Provisional Patent Application No. 61/680,177 filed Aug. 6, 2012 and U.S. Provisional Patent Application No. 61/592,441 filed Jan. 30, 2012, both of which are herein incorporated by reference in their entirety.

BACKGROUND

I. Field

Aspects of the present disclosure relate generally to wireless communications, and more particularly, to techniques for performing reference signal metric measurements in different parts of a channel bandwidth.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

In an aspect of the disclosure, a method for wireless communications is provided. The method generally includes receiving signaling indicating one or more frequency bands within an operating frequency band of a current serving cell for performing reference signal (RS) metric measurements, performing the measurements on the one or more frequency bands, and reporting the measurements.

In an aspect of the disclosure, an apparatus for wireless communications is provided. The apparatus generally includes means for receiving signaling indicating one or more frequency bands within an operating frequency band of a current serving cell for performing reference signal (RS) metric measurements, means for performing the measurements on the one or more frequency bands, and means for reporting the measurements.

In an aspect of the disclosure, an apparatus for wireless communications is provided. The apparatus generally includes at least one processor configured to receive signaling indicating one or more frequency bands within an operating frequency band of a current serving cell for performing reference signal (RS) metric measurements, perform the measurements on the one or more frequency bands, and report the measurements. The apparatus also includes a memory coupled with the at least one processor.

In an aspect of the disclosure, a computer-program product for wireless communications is provided. The computer-program product generally includes a computer-readable medium having instructions stored thereon, the instructions being executable by one or more processors and the instructions comprising instructions for receiving signaling indicating one or more frequency bands within an operating frequency band of a current serving cell for performing reference signal (RS) metric measurements, instructions for performing the measurements on the one or more frequency bands, and instructions for reporting the measurement.

In an aspect of the disclosure, a method for wireless communications is provided. The method generally includes transmitting signaling, to a user equipment (UE), indicating one or more frequency bands within an operating frequency band of a current serving cell for the UE to perform reference signal (RS) metric measurements and receiving a report from the UE, based on the RS metric measurements taken at the one or more frequency bands.

In an aspect of the disclosure, an apparatus for wireless communications is provided. The apparatus generally includes means for transmitting signaling, to a user equipment (UE), indicating one or more frequency bands within an operating frequency band of a current serving cell for the UE to perform reference signal (RS) metric measurements and means for receiving a report from the UE, based on the RS metric measurements taken at the one or more frequency bands.

In an aspect of the disclosure, an apparatus for wireless communications is provided. The apparatus generally includes at least one processor configured to transmit signaling, to a user equipment (UE), indicating one or more frequency bands within an operating frequency band of a current serving cell for the UE to perform reference signal (RS) metric measurements and receive a report from the UE, based on the RS metric measurements taken at the one or more frequency bands. The apparatus also includes a memory coupled with the at least one processor.

In an aspect of the disclosure, a computer-program product for wireless communications is provided. The computer-program product generally includes a computer-readable medium having instructions stored thereon, the instructions being executable by one or more processors and the instructions comprising instructions for transmitting signaling, to a user equipment (UE), indicating one or more frequency bands within an operating frequency band of a current serving cell for the UE to perform reference signal (RS) metric measurements and instructions for receiving a report from the UE, based on the RS metric measurements taken at the one or more frequency bands.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
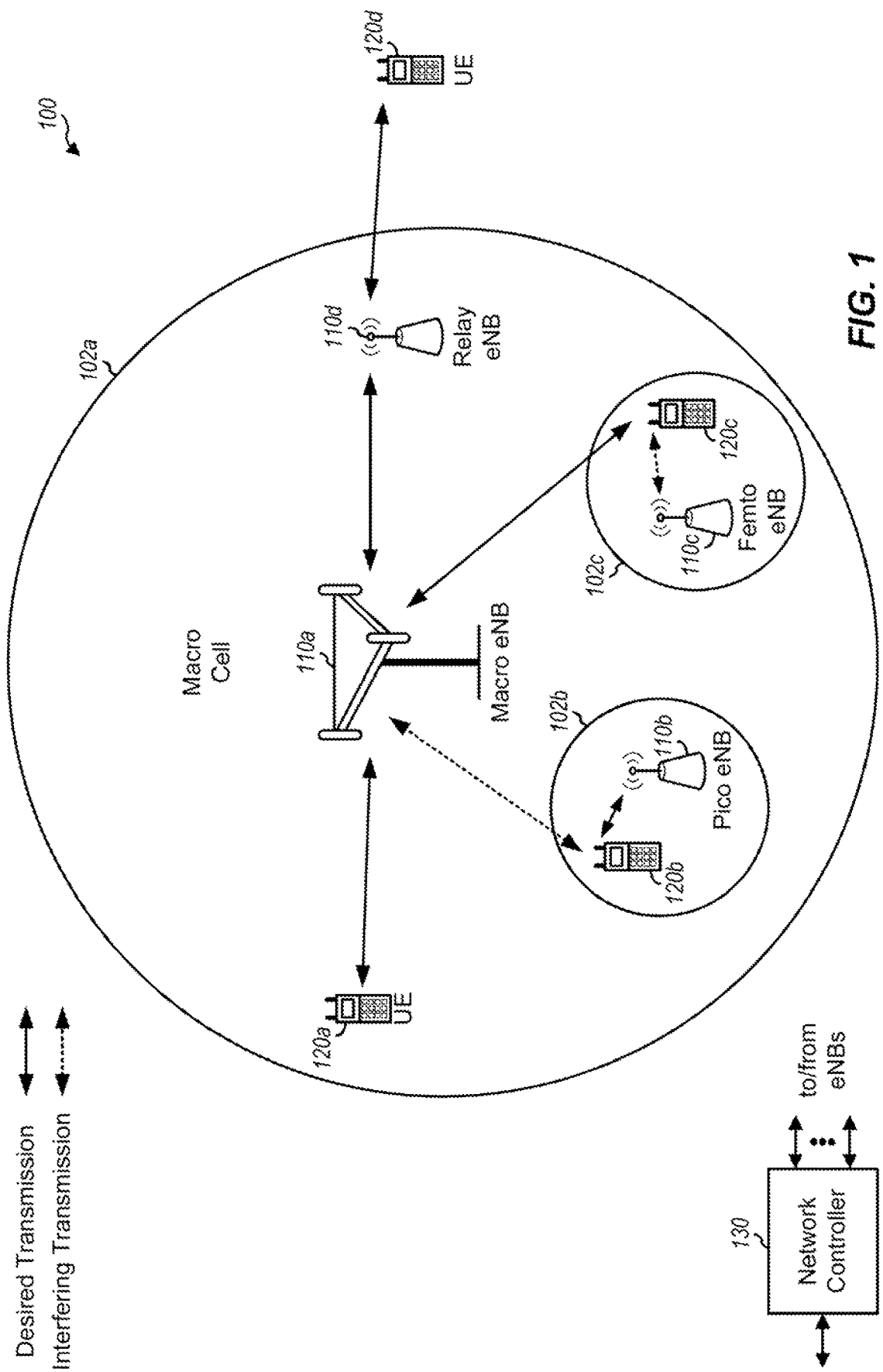
FIG. 1 is a block diagram conceptually illustrating an example of a wireless communications network in accordance with certain aspects of the present disclosure.

FIG. 1 shows a wireless communication network 100. The network 100 may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

As will be described in greater detail below, according to certain aspects, eNBs may perform inter-cell interference coordination (ICIC). ICIC may involve negotiation between eNBs to achieve resource coordination/partitioning to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
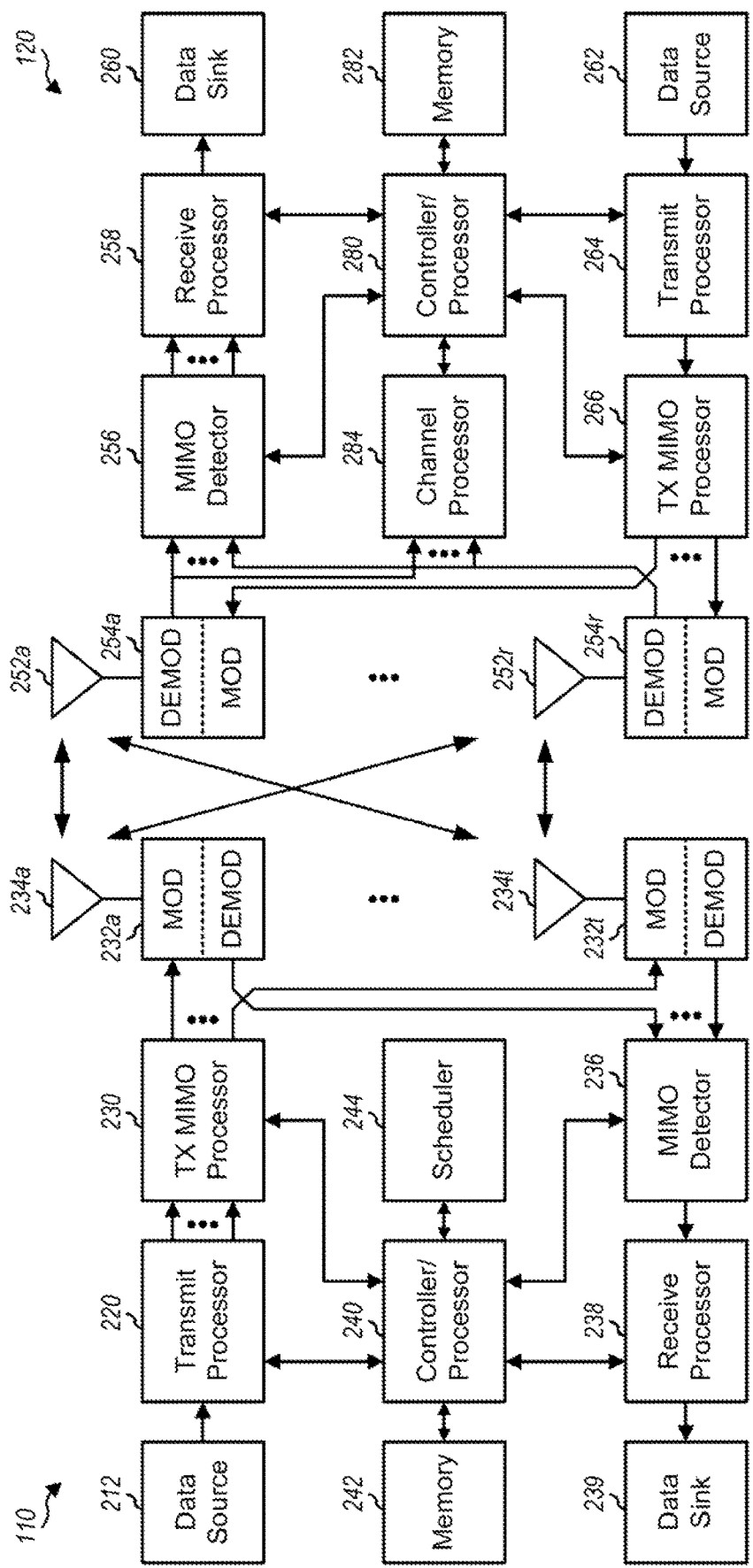
FIG. 2 shows a block diagram conceptually illustrating an example of a Node B in communication with a user equipment device (UE) in a wireless communications network in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine reference signal received power (RSRP), received signal strength indicator (RSSI), reference signal received quality (RSRQ), channel quality indicator (CQI), etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations for configuring a UE for various random access procedures and identify one or more attributes during such procedures, as described herein. For example, processor 280 and/or other processors and modules at UE 120 may perform or direct operations for various random access procedures described herein. Memories 242 and 282 may store data and program codes for base station 110 and UE 120, respectively. A scheduler 244 may schedule UEs for data transmission on the downlink and/or uplink.

Figure 3:
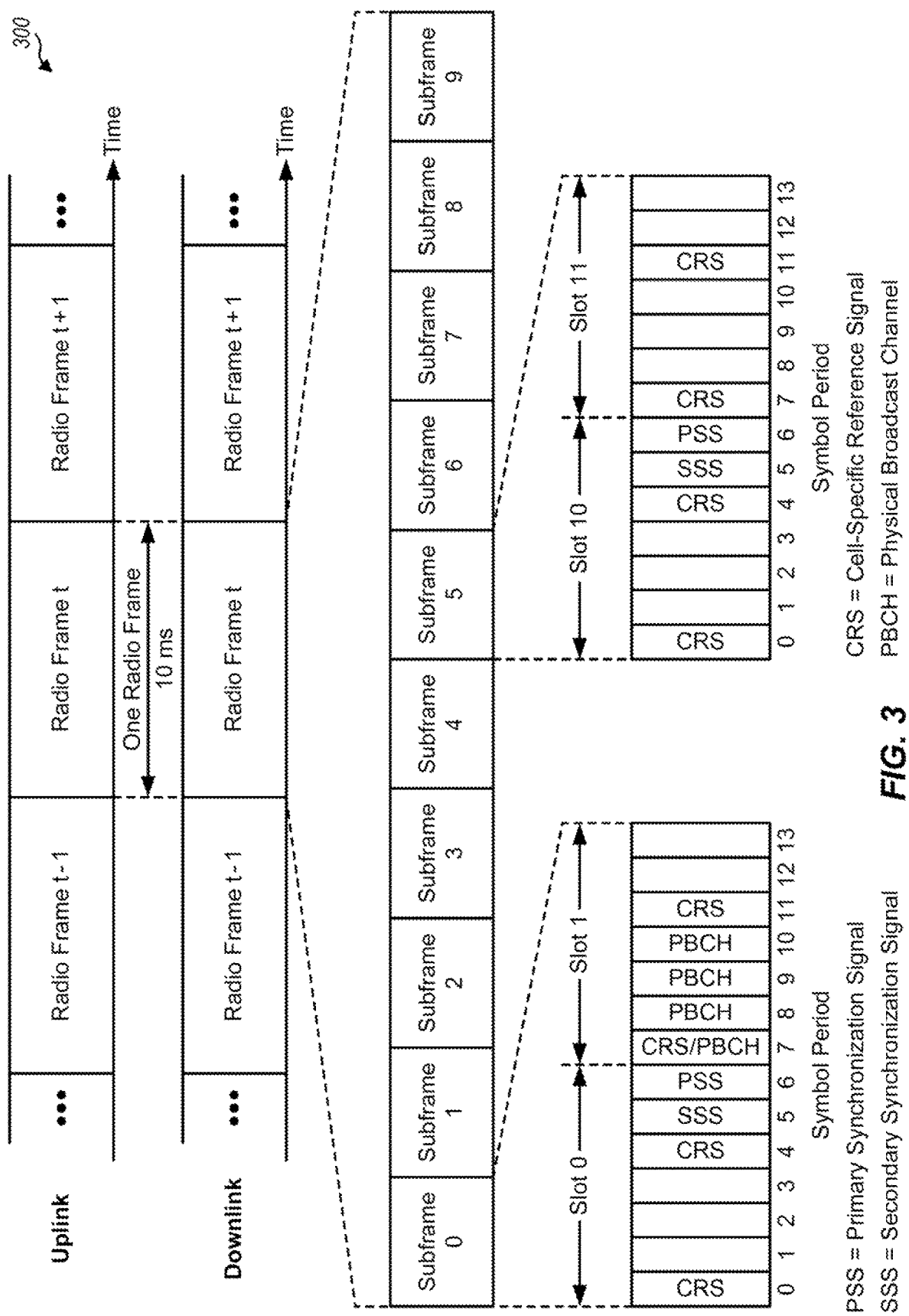
FIG. 3 is a block diagram conceptually illustrating an example of a frame structure in a wireless communications network in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
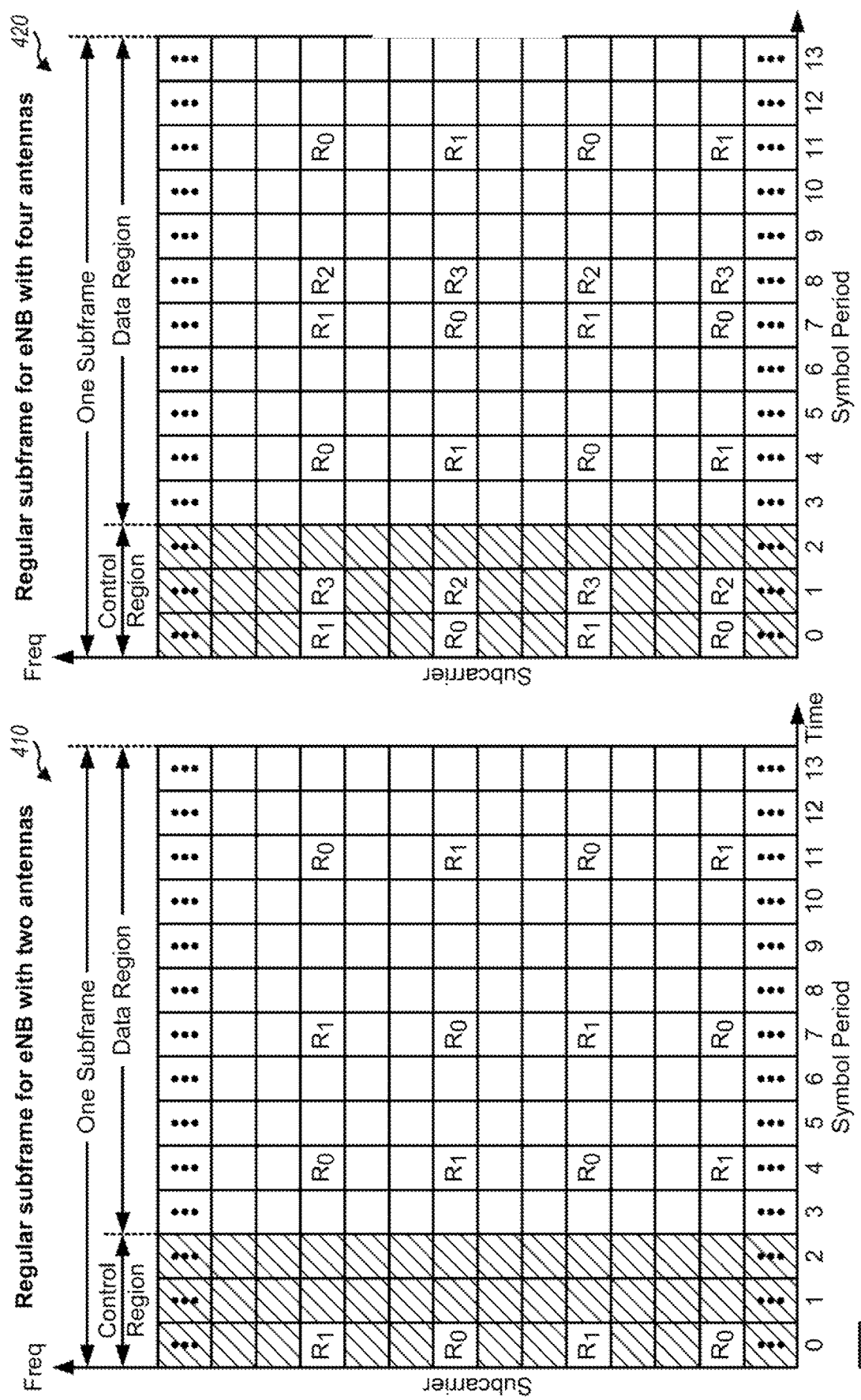
FIG. 4 illustrates two exemplary subframe formats for the downlink with the normal cyclic prefix in accordance with certain aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 5:
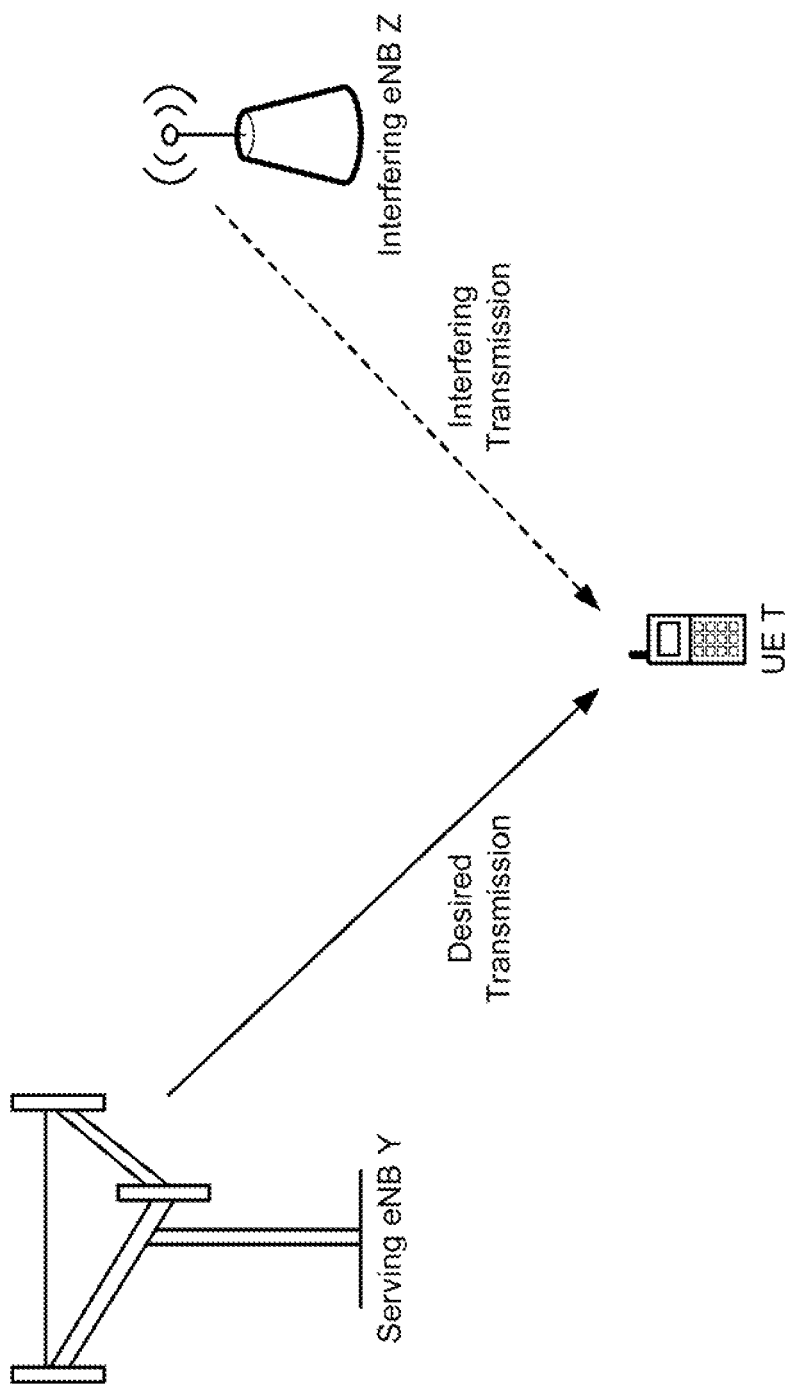
FIG. 5 illustrates an exemplary dominant interference scenario in accordance with certain aspects of the present disclosure.

FIG. 5 shows an exemplary dominant interference scenario. In the example shown in FIG. 5, a UE T may communicate with a serving eNB Y and may observe high interference from a strong/dominant interfering eNB Z.

A dominant interference scenario may occur due to restricted association. For example, in FIG. 5, eNB Y may be a macro eNB, and eNB Z may be a femto eNB. UE T may be located close to femto eNB Z and may have high received power for eNB Z. However, UE T may not be able to access femto eNB Z due to restricted association and may then connect to macro eNB Y with lower received power. UE T may then observe high interference from femto eNB Z on the downlink and may also cause high interference to femto eNB Z on the uplink.

A dominant interference scenario may also occur due to range extension, which is a scenario in which a UE connects to an eNB with lower pathloss and possibly lower SINR among all eNBs detected by the UE. For example, in FIG. 5, eNB Y may be a pico eNB, and interfering eNB Z may be a macro eNB. UE T may be located closer to pico eNB Y than macro eNB Z and may have lower pathloss for pico eNB Y. However, UE T may have lower received power for pico eNB Y than macro eNB Z due to a lower transmit power level of pico eNB Y as compared to macro eNB Z. Nevertheless, it may be desirable for UE T to connect to pico eNB Y due to the lower pathloss. This may result in less interference to the wireless network for a given data rate for UE T. Referring back to FIG. 1, for UE 120b connected to pico eNB 110b, the macro eNB 110a may avoid transmitting on allocated/protected resources, possibly except for interfering CRS transmissions. Therefore, based on parameters related to the interference, the UE 120b may determine whether to perform interference cancelation or puncturing on the interfering CRS transmissions.

In general, a UE may be located within the coverage of any number of eNBs. One eNB may be selected to serve the UE, and the remaining eNBs may be interfering eNBs. The UE may thus have any number of interfering eNBs. For clarity, much of the description assumes the scenario shown in FIG. 5 with one serving eNB Y and one interfering eNB Z.

Communication in a dominant interference scenario may be supported by performing inter-cell interference coordination (ICIC). According to certain aspects of ICIC, resource coordination/partitioning may be performed to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB.

In general, time and/or frequency resources may be allocated to eNBs via resource partitioning. According to certain aspects, the system bandwidth may be partitioned into a number of subbands, and one or more subbands may be allocated to an eNB. In another design, a set of subframes may be allocated to an eNB. In yet another design, a set of resource blocks may be allocated to an eNB. For clarity, much of the description below assumes a time division multiplex (TDM) resource partitioning design in which one or more interlaces may be allocated to an eNB. The subframes of the allocated interlace(s) may observe reduced or no interference from strong interfering eNBs.

Figure 6:
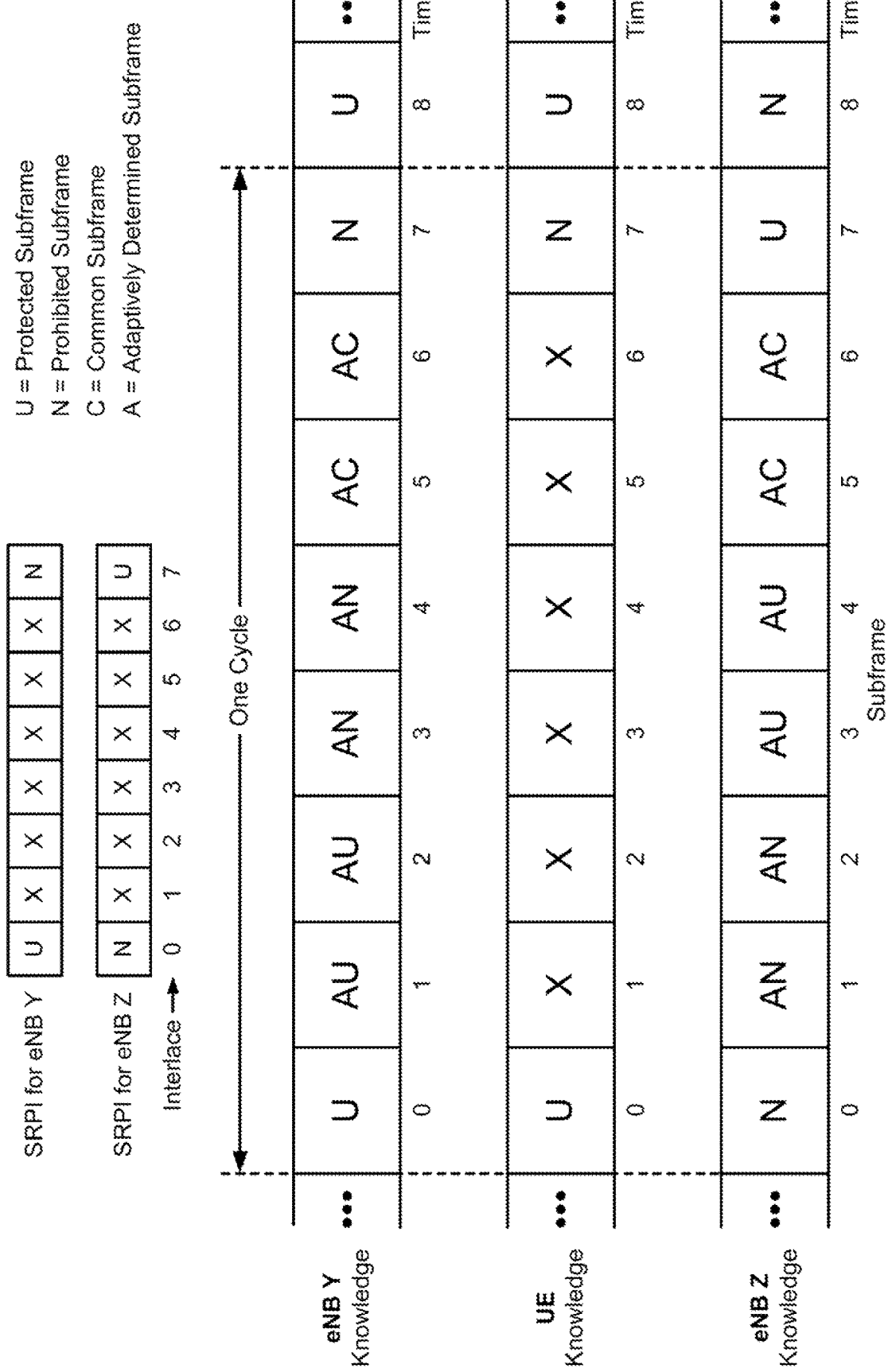
FIG. 6 illustrates example cooperative partitioning of sub-frames in a heterogeneous network in accordance with certain aspects of the present disclosure.

FIG. 6 shows an example of TDM resource partitioning to support communication in the dominant interference scenario in FIG. 5. In the example shown in FIG. 6, eNB Y may be allocated interlace 0, and eNB Z may be allocated interlace 7 in a semi-static or static manner, e.g., via negotiation between the eNBs through the backhaul. eNB Y can transmit data in subframes of interlace 0 and may avoid transmitting data in subframes of interlace 7. Conversely, eNB Z can transmit data in subframes of interlace 7 and may avoid transmitting data in subframes of interlace 0. The subframes of the remaining interlaces 1 through 6 may be adaptively/dynamically allocated to eNB Y and/or eNB Z.

Table 1 lists different types of subframes in accordance with one design. From the perspective of eNB Y, an interlace allocated to eNB Y may include "protected" subframes (U subframes) that can be used by eNB Y and having little or no interference from interfering eNBs. An interlace allocated to another eNB Z may include "prohibited" subframes (N subframes) that cannot be used by eNB Y for data transmission. An interlace not allocated to any eNB may include "common" subframes (C subframes) that can be used by different eNBs. A subframe that is adaptively allocated is denoted with an "A" prefix and may be a protected subframe (AU subframe), or a prohibited subframe (AN subframe), or a common subframe (AC subframe). The different types of subframes may also be referred to by other names. For example, a protected subframe may be referred to as a reserved subframe, an allocated subframe, etc.

TABLE 1

Subframe Types

| Subframe Type | Description | Expected CQI |
|---|---|---|
| U | Protected subframe that can be used for data transmission and having reduced or no interference from interfering eNBs. | High CQI |
| N | Prohibited subframe that cannot be used for data transmission. | Low CQI |
| C | Common subframe that can be used for data transmission by different eNBs. | High or Low CQI |

According to certain aspects, an eNB may transmit static resource partitioning information (SRPI) to its UEs. According to certain aspects, the SRPI may comprise Q fields for the Q interlaces. The field for each interlace may be set to "U" to indicate the interlace being allocated to the eNB and including U subframes, or to "N" to indicate the interlace being allocated to another eNB and including N subframes, or to "X" to indicate the interlace being adaptively allocated to any eNB and including X subframes. A UE may receive the SRPI from the eNB and can identify U subframes and N subframes for the eNB based on the SRPI. For each interlace marked as "X" in the SRPI, the UE may not know whether the X subframes in that interlace will be AU subframes, or AN subframes, or AC subframes. The UE may know only the semi-static part of the resource partitioning via the SRPI whereas the eNB may know both the semi-static part and adaptive part of the resource partitioning. In the example shown in FIG. 6, the SRPI for eNB Y may include "U" for interlace 0, "N" for interlace 7, and "X" for each remaining interlace. The SRPI for eNB Z may include "U" for interlace 7, "N" for interlace 0, and "X" for each remaining interlace.

A UE may estimate received signal quality of a serving eNB based on a CRS from the serving eNB. The UE may determine CQI based on the received signal quality and may report the CQI to the serving eNB. The serving eNB may use the CQI for link adaptation to select a modulation and coding scheme (MCS) for data transmission to the UE. Different types of subframes may have different amounts of interference and hence may have very different CQIs. In particular, protected subframes (e.g., U and AU subframes) may be characterized by better CQI since dominant interfering eNBs do not transmit in these subframes. In contrast, CQI may be much worse for other subframes (e.g., N, AN and AC subframes) in which one or more dominant interfering eNBs can transmit. From the point of view of CQI, AU subframes may be equivalent to U subframes (both are protected), and AN subframes may be equivalent to N subframes (both are prohibited). AC subframes may be characterized by a completely different CQI. To achieve good link adaptation performance, the serving eNB should have relatively accurate CQI for each subframe in which the eNB transmits traffic data to the UE.

Flexible Radio Resource Management (RRM) Measurements for Wireless Networks

In cellular networks, UEs are required to measure different metrics of signal strength/quality and report them to a serving base station (e.g., eNB). Examples of such measurements include reference signal received power (RSRP) and reference signal receive quality (RSRQ). Based on radio resource management (RRM) measurements such as these, cell selection and handover decisions may be made. In order for the UE/eNB to make the best decision, it may be required for the measurements to be accurate and reflect the actual quality of the signal received at the UE.

In LTE, the UE may perform measurements only on the center 6 RBs (1.08 MHz) of the channel bandwidth irrespective of the actual channel bandwidth of the cell that is measured. This may enable the UE to perform measurements without knowing the actual channel bandwidth and may reduce the power consumption because the UE is processing a narrow band signal. However, accuracy may not be as good as a wide band measurements (e.g., using an entire 10 MHz channel).

Figure 7:
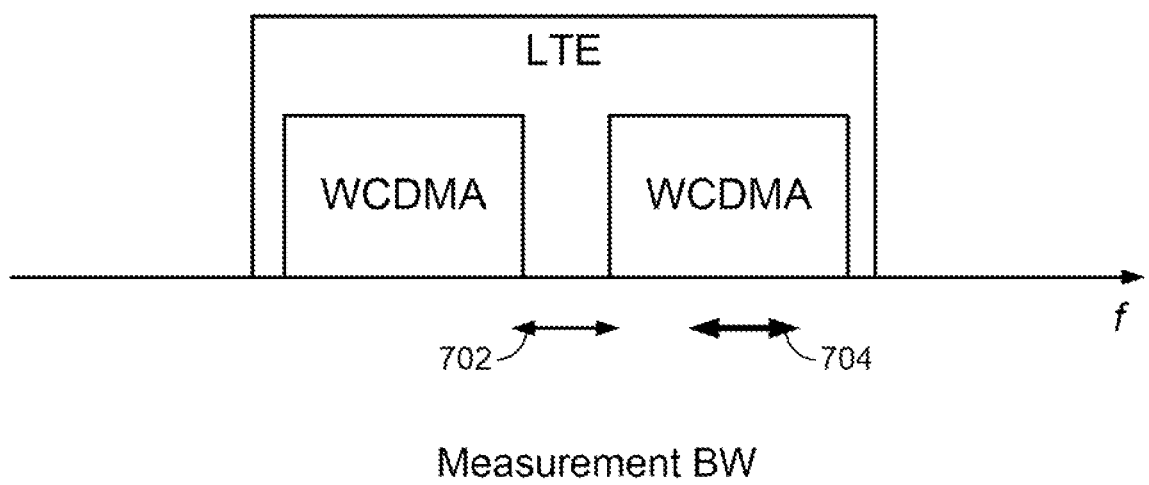
FIG. 7 illustrates an LTE channel overlapping two adjacent WCDMA channels.

The accuracy of the RS metric measurements may become an issue in cases when interference is present only in some parts of the channel bandwidth. For example, referring to FIG. 7, an LTE cell using a 10 MHz channel may overlap two adjacent WCDMA neighbor cells that may cause interference. Although WCDMA neighbor cells are illustrated, neighbor cells of other radio access technologies (RATs) may also cause interference. In addition, although it is illustrated that interference from the neighboring WCDMA cells may cutoff at a certain frequency, the interference may rather be reduced gradually (not illustrated).

As illustrated, the center of the LTE channels may fall in the gap between the WCDMA channels. Therefore, the signal quality measured in the middle of the channel (at 702) may be better than the signal quality measured in a different part of the channel, for example, at a portion that may receive interference from a WCDMA cell (at 704). Reporting measurements made at 702 may not properly reflect the strength/quality of the entire channel, and may lead to overestimation or underestimation of the signal quality, which in turn could possibly lead to improper cell selections or hand over decisions. Therefore, certain aspects of the present disclosure provide techniques for performing RS metric measurements in different parts of a channel bandwidth, in order to make proper cell selections and handover decisions.

Figure 8:
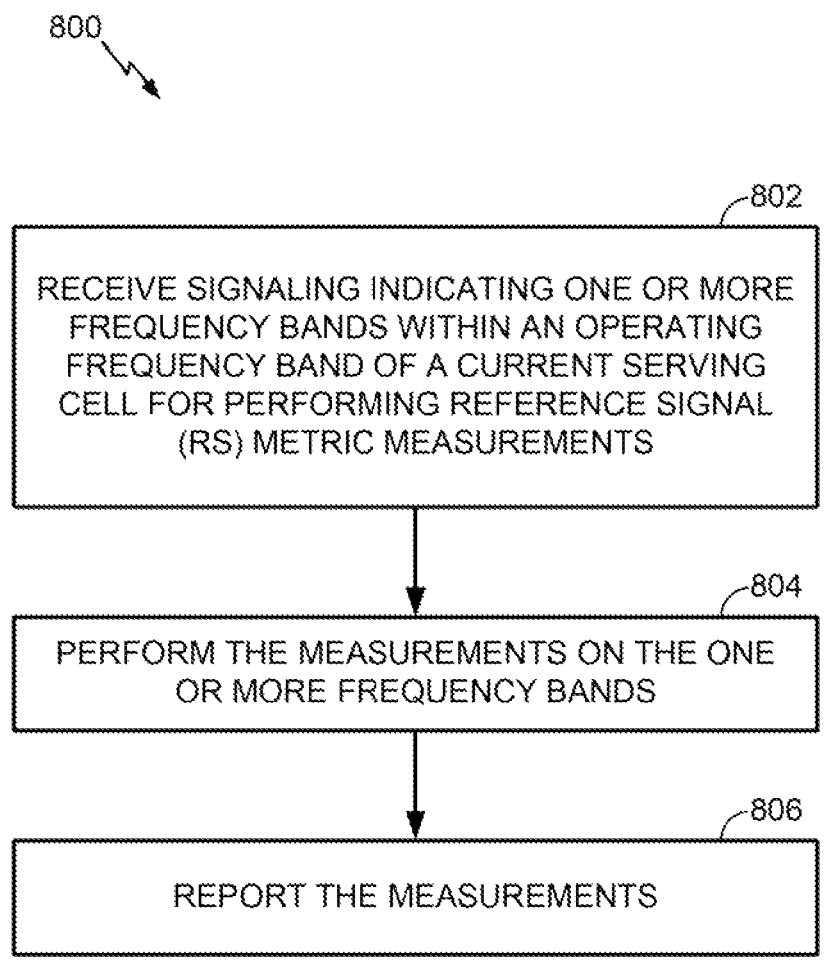
FIG. 8 illustrates example operations for performing reference signal (RS) metric measurements, according to certain aspects of the present disclosure.

FIG. 8 illustrates example operations 800 for performing RS metric measurements, according to certain aspects of the present disclosure. The operations 800 may be performed, for example, by processor(s) 258, 284, 280, 264, and/or 266 of the UE 120.

At 802, the UE may receive signaling indicating one or more frequency bands within an operating frequency band of a current serving cell for performing the RS metric measurements. For certain aspects, the UE may receive signaling (e.g., from a serving BS) indicating at least two frequency bands for performing the measurements. For example, the signaling may indicate a center frequency band or at least one offset from the center frequency band. As another example, the signaling may indicate multiple frequency bands. In some embodiments, some of the indicated frequency bands may overlap one another.

At 804, the UE may perform the measurements on the one or more frequency bands. For certain aspects, the measurements may include measuring on six resource blocks (RBs) at the center frequency band.

At 806, the UE may report the measurements. For certain aspects, such as when the UE performs the measurements on at least two frequency bands, the UE may receive signaling indicating whether to report the measurements taken over the at least two frequency bands separately or to average the measurements taken over the at least two frequency bands. In some embodiments, the signaling may comprise 1 bit indicating narrowband or wideband.

Figure 9:
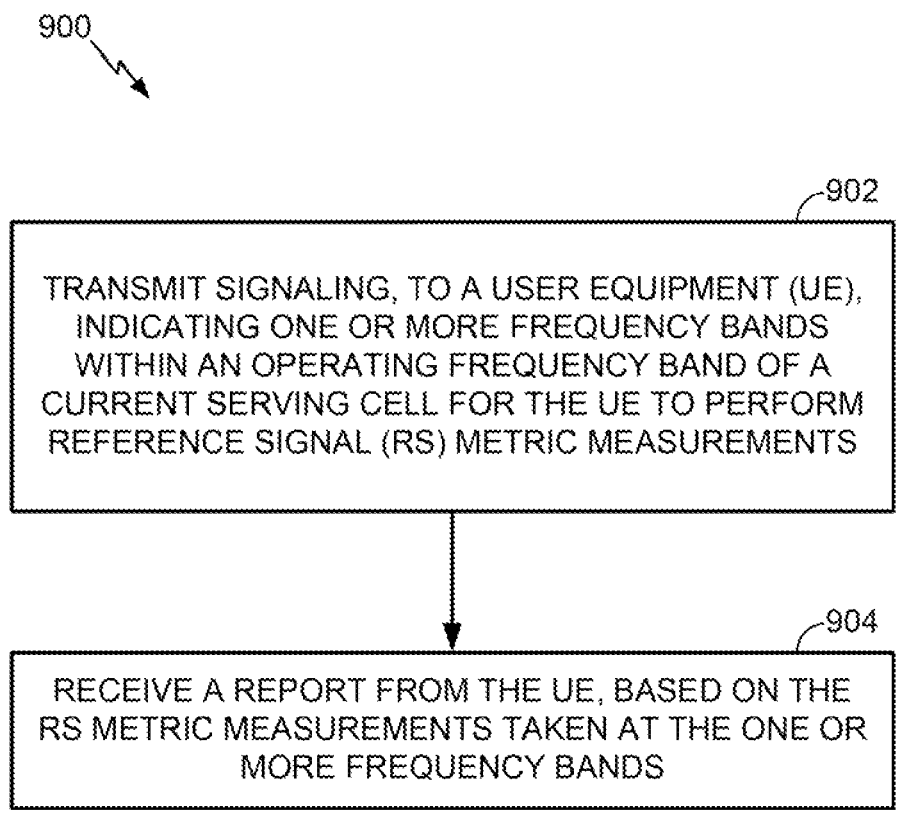
FIG. 9 illustrates example operations for determining portions of a channel bandwidth for performing RS metric measurement, according to certain aspects of the present disclosure.

FIG. 9 illustrates example operations 900 for determining portions of a channel bandwidth for performing RS metric measurement, according to certain aspects of the present disclosure. The operations 900 may be performed, for example, by processor(s) 220, 230, 240, and/or 238 of the eNB 110.

At 902, the eNB may transmit signaling, to a UE, indicating one or more frequency bands within an operating frequency band of a current serving cell for the UE to perform the RS metric measurements. For certain aspects, the eNB may transmit signaling indicating at least two frequency bands for performing the measurements. For example, the signaling may indicate a center frequency band or at least one offset from the center frequency band. At 904, the eNB may receive a report from the UE, based on the RS metric measurements taken at the one or more frequency bands.

As described above, the UE may measure different parts of a channel bandwidth and report the measurements. For example, the UE may take signal samples at a frequency that is not in the center of the channel bandwidth to be measured. For certain aspects, the measurement bandwidth for one sample may be kept at the center of the channel bandwidth (e.g., the center 6 RBs), such that the processing impact may be at a minimum. The UE may send multiple reports to the serving BS for different frequencies, or the UE may average over multiple samples and send one wide band averaged measurement report.

For certain aspects, the eNB may signal the UE at what offset from the channel center to perform measurements and whether averaging over a certain frequency span should be performed or not. The UE may send multiple reports with measurement results at a certain frequency or averaged over a certain bandwidth. Therefore, the network may obtain an accurate measurement of a certain part of the channel bandwidth and assess the signal quality. If the channel bandwidth of the cells to be measured is not known to the UE this data may be provided by the network.

The techniques described above may be used for both intra-frequency and inter-frequency measurements. The network can provide the center frequency and the offset of the frequency band to be measured.

RSRQ Measurements for Wireless Networks

Examples of received signal metric measurements include RSRP and RSRQ. RSRP is defined as the linear average over the power contributions of the resource elements that carry cell-specific reference signals within a considered measurement frequency bandwidth. RSRQ is defined as the ratio N×RSRP/RSSI, where N is the number of resource blocks of the E-UTRA carrier received signal strength indicator (RSSI) measurement bandwidth.

Traditionally, the measurements in the numerator and denominator of the RSRQ computation are generally made over the same set of resource blocks. Therefore, RSRP and RSRQ are traditionally computed over the same bandwidth. As an example, RSRP and RSRQ may be computed over the center 6 RBs. However, computing the received signal metric measurements over the same bandwidth may impose restrictions on the implementation of the RSRQ measurements, particularly with wideband measurements. Certain aspects of the present disclosure provide techniques for performing received signal metric measurements over different bandwidths or different subbands of a channel.

When measuring the RSRP of a channel, the value of RSRP may not depend on the subband where it is measured. Rather, the value of RSRP may be constant throughout the entire channel bandwidth. However, the value of RSSI may vary in frequency depending on the level of interference present on the resources where it is measured. For example, referring back to FIG. 7, the value of RSSI may vary between measurements made at 702 and measurements made at 704. Therefore, computing RSRQ by measuring RSRP over a narrow band (and scaled accordingly) and RSSI on a wider band may have the same result as measuring both RSRP and RSRQ over the same bandwidth.

Referring back to FIG. 7, reporting measurements made at 702 may not properly reflect the strength/quality of the entire channel, and may lead to overestimation or underestimation of the signal quality, which in turn could possibly lead to improper cell selections or hand over decisions. Therefore, the received signal metric measurements, particularly RSSI, may be performed in different parts of a channel bandwidth (e.g., the second subset of frequency bands). With regards to RSRP, the value of RSRP may not depend on the subband where it is measured. Rather, the value of RSRP may be constant throughout the entire channel bandwidth. However, RSRP may also be performed in different parts of the channel bandwidth (e.g., the first subset of frequency bands). Thereafter, the UE may send multiple reports to a serving BS for the different bands, or the UE may average over multiple bands and send one measurement report. For example, the UE may average the first received signal metric measurements taken over the first subset of frequency bands, average the second received signal metric measurements taken over the second subset of frequency bands, and divide the average of the first received signal metric measurements by the average of the second received signal metric measurements. In another example, the UE may divide the first received signal metric measurements by the second received signal metric measurements.

Certain aspects of the present disclosure provide techniques for allow RSRP and RSRQ to be measured over a different bandwidth or resources. For example, RSSI may be computed over a wider bandwidth and RSRP on a narrow bandwidth (e.g., 6 RBs). Certain aspects of the present of the present disclosure allow various combinations of RSRP and RSSI bandwidths as long as accuracy requirements are met.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
   receiving signaling indicating one or more frequency subbands of a frequency band within an operating frequency band of a current serving cell for performing reference signal (RS) metric measurements, wherein the receiving comprises receiving signaling indicating at least two frequency subbands for performing the measurements;
   receiving signaling indicating whether to report the measurements taken over the at least two frequency subbands separately or to average the measurements taken over the at least two frequency subbands;
   performing the measurements on the one or more frequency subbands, comprising performing a reference signal received power (RSRP) measurement over a narrow band and performing a reference signal strength indicator (RSSI) measurement over a wider band and computing a reference signal received quality (RSRQ) based on the measured RSRP and RSSI; and
   reporting the measurements.

2. The method of claim 1, wherein the signaling comprises at least one offset from a center frequency band.

3. The method of claim 2, wherein the signaling further indicates the center frequency band.

4. The method of claim 1, wherein:
   one of the at least two frequency subbands corresponds to a center frequency band; and
   performing the measurements comprise measuring on six resource blocks (RBs) at the center frequency band.

5. The method of claim 1, wherein the reporting comprises averaging measurements taken over the at least two frequency subbands.

6. The method of claim 1, wherein the reporting comprises separately reporting measurements taken over the at least two frequency subbands.

7. The method of claim 1, wherein at least one of the two frequency subbands overlaps with at least one other of the at least two frequency subbands.

8. The method of claim 1, wherein a first frequency band of the one or more frequency subbands is within a bandwidth of a Code Division Multiple Access (CDMA) channel.

9. An apparatus for wireless communications, comprising:

means for receiving signaling indicating one or more frequency subbands of a frequency band within an operating frequency band of a current serving cell for performing reference signal (RS) metric measurements, wherein the means for receiving comprises means for receiving signaling indicating at least two frequency subbands for performing the measurements;

means for receiving signaling indicating whether to report the measurements taken over the at least two frequency subbands separately or to average the measurements taken over the at least two frequency subbands;

means for performing the measurements on the one or more frequency subbands, the means for performing the measurements comprising means for performing a reference signal received power (RSRP) measurement over a narrow band, means for performing a reference signal strength indicator (RSSI) measurement over a wider band, and means for computing a reference signal received quality (RSRQ) based on the measured RSRP and RSSI; and means for reporting the measurements.

10. The apparatus of claim 9, wherein the signaling comprises at least one offset from a center frequency band.

11. The apparatus of claim 10, wherein the signaling further indicates the center frequency band.

12. The apparatus of claim 9, wherein:
one of the at least two frequency subbands corresponds to a center frequency band; and
performing the measurements comprise measuring on six resource blocks (RBs) at the center frequency band.

13. The apparatus of claim 9, wherein the reporting comprises averaging measurements taken over the at least two frequency subbands.

14. The apparatus of claim 9, wherein the reporting comprises separately reporting measurements taken over the at least two frequency subbands.

15. The apparatus of claim 9, wherein at least one of the at least two frequency subbands overlaps with at least one other of the at least two frequency subbands.

16. An apparatus for wireless communications, comprising:
at least one processor configured to:
receive signaling indicating one or more frequency subbands of a frequency band within an operating frequency band of a current serving cell for performing reference signal (RS) metric measurements, wherein the receiving comprises receiving signaling indicating at least two frequency subbands for performing the measurements;
receive signaling indicating whether to report the measurements taken over the at least two frequency subbands separately or to average the measurements taken over the at least two frequency subbands;
perform the measurements on the one or more frequency subbands, comprising performing a reference signal received power (RSRP) measurement over a narrow band and performing a reference signal strength indicator (RSSI) measurement over a wider band and computing a reference signal received quality (RSRQ) based on the measured RSRP and RSSI; and
report the measurements; and
a memory coupled with the at least one processor.

17. A non-transitory computer-readable medium for wireless communications, the non-transitory computer-readable medium having instructions stored thereon, the instructions being executable by one or more processors and the instructions comprising:
instructions for receiving signaling indicating one or more frequency subbands of a frequency band within an operating frequency band of a current serving cell for performing reference signal (RS) metric measurements, wherein the receiving comprises receiving signaling indicating at least two frequency subbands for performing the measurements;
instructions for receiving signaling indicating whether to report the measurements taken over the at least two frequency subbands separately or to average the measurements taken over the at least two frequency subbands;
instructions for performing the measurements on the one or more frequency subbands, comprising performing a reference signal received power (RSRP) measurement over a narrow band and performing a reference signal strength indicator (RSSI) measurement over a wider band and computing a reference signal received quality (RSRQ) based on the measured RSRP and RSSI; and
instructions for reporting the measurements.

* * * * *